United States Patent [19]
Kelley, Jr. et al.

[11] 3,959,712
[45] May 25, 1976

[54] PHASE CONVERTER
[75] Inventors: Fred W. Kelley, Jr., Media, Pa.;
Georges R. E. Lezan, Cherry Hill, N.J.
[73] Assignee: General Electric Corporation, Phila, Pa.
[22] Filed: Dec. 18, 1974
[21] Appl. No.: 534,054

[52] U.S. Cl.................................. 321/56; 321/54
[51] Int. Cl.².......................................... H02M 5/257
[58] Field of Search .......... 315/138, 139, 141, 142; 321/3, 5, 45 C, 51–54, 56, 58

[56] References Cited
UNITED STATES PATENTS

| | | | |
|---|---|---|---|
| 1,684,317 | 9/1928 | Harms | 315/139 X |
| 1,948,119 | 2/1934 | Löbl | 321/56 X |
| 2,009,834 | 7/1935 | Bedford | 315/142 |
| 2,428,543 | 10/1947 | Boyer et al. | 315/142 X |
| 2,474,866 | 7/1949 | Sciaky | 321/3 X |
| 3,541,423 | 11/1970 | Kelley et al. | 321/5 |
| 3,546,562 | 12/1970 | Havas et al. | 321/58 X |

Primary Examiner—A. D. Pellinen
Attorney, Agent, or Firm—J. Wesley Haubner

[57] ABSTRACT

A semiconductor valve type converter for supplying single phase load current at power frequency from an N phase polyphase power system without unbalance of polyphase current or voltage comprises a transformer having KN secondary phase voltages displaced by 180/KN electrical degress (where K is an integer) and a bridge type thyristor network for connecting each secondary phase voltage source alternately to positive and negative network buses. The network buses are connected through a centertapped reactor with the single phase load connected between the reactor tap and the secondary phase voltage sources. A commutating circuit effectively connected across the last thyristor to fire during each positive and negative half cycle of single phase output voltage may be provided if necessary to effect the network reversal of single phase current at each half cycle of power frequency.

6 Claims, 8 Drawing Figures

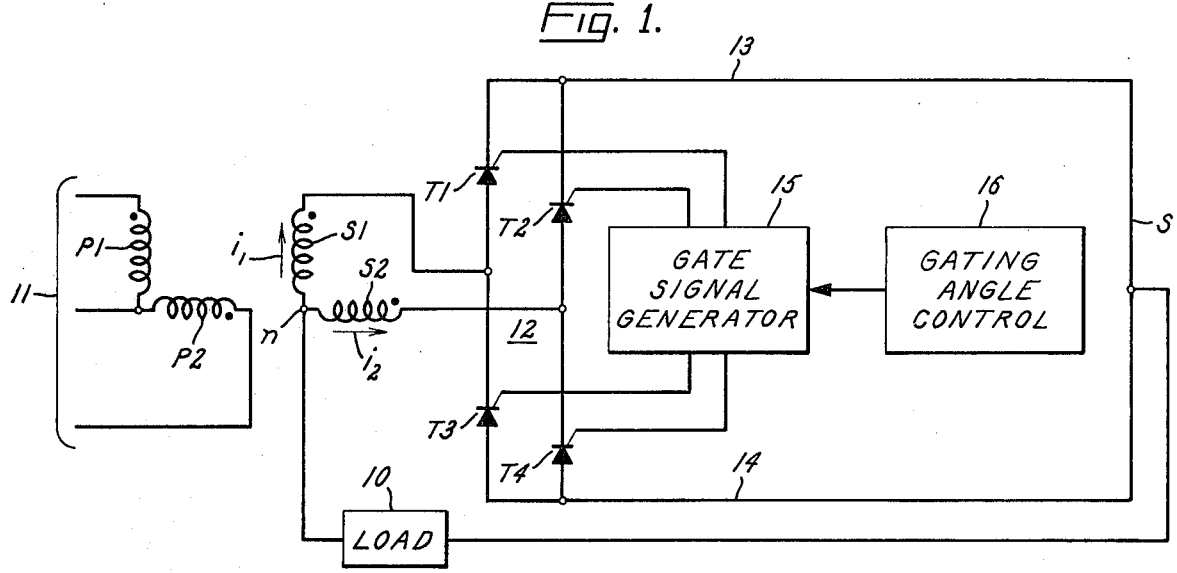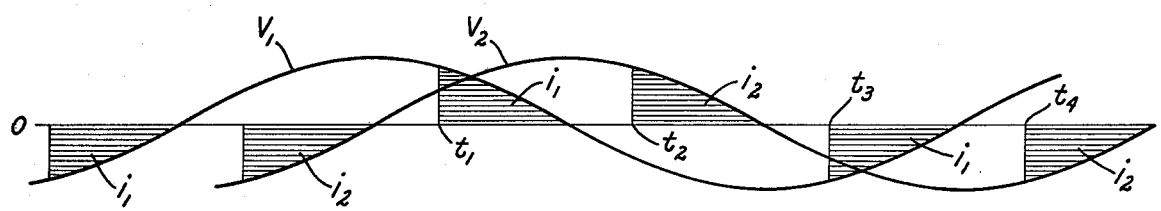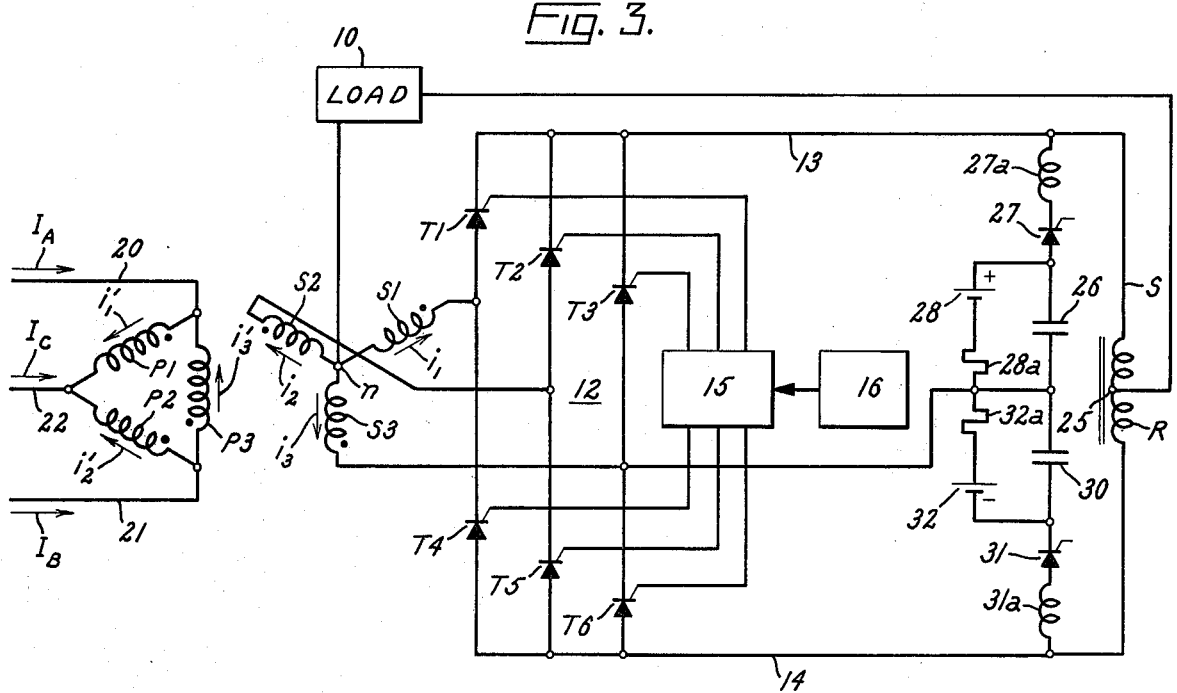

PHASE CONVERTER

Our invention relates to electric phase converters, and more particularly to semiconductor valve converters for supplying single phase alternating current at power system frequency from a polyphase power supply circuit without causing unbalance of line or phase voltage or current in the polyphase circuit. The invention is especially applicable to large single phase industrial loads such as electric induction furnaces, resistance heating furnaces and the like.

The need for polyphase to single phase converters for connecting large single phase loads to a polyphase system without current or voltage unbalance in the polyphase system has been recognized for a long time. Many special transformer connections and impedance type voltage dividers have been proposed for this purpose.

Typically such special transformer connections and impedance networks must be adjusted as the power factor or magnitude of load current varies and switching means for this purpose are costly and not well suited to rapid change in load current and power factor.

Balanced conversion of polyphase current to single phase current at one third the frequency of the polyphase circuit has been accomplished by means of unilaterally conducting valves in the manner shown in U.S. Pat. No. 2,356,859— Leathers et al. The circuit of the Leathers patent is particularly adapted to welding circuits where the load current is typically applied in short bursts or pulses so that frequency, and indeed even an alternating character, is not of major significance. Single phase industrial loads designed for steady state operation are typically sufficiently large to constitute a significant portion of the total load on a polyphase power supply circuit. Such single phase loads cannot be operated at a fraction of power system frequency because the low frequency current components reflected back into the polyphase system, even if balanced, would cause excessive voltage distortion. The low frequency converter of the Leathers et al patent is not adapted to any control mode which would produce a single output at the frequency of the polyphase supply circuit.

Accordingly, it is a general object of our invention to provide improved semiconductor valve means for connecting a single phase load to a polyphase power system without change in frequency and without causing unbalance of current or voltage on the polyphase system.

It is a further object of our invention to provide a commutated phase converter of the semiconductor type for providing single phase alternating current from a polyphase power system of the same frequency which is continuously operable to draw balanced load current from the polyphase system irrespective of changes in the single phase load current or power factor.

It is a more particular object of our invention to provide polyphase to single phase converter of the phasecontrolled semiconductor type having commutating means for producing single phase current at the frequency of the polyphase power supply system.

In carrying out our invention in one preferred embodiment we provide a power transformer having polyphase primary windings adapted for connection to a polyphase power circuit of "N" phases. The transformer secondary windings are connected to provide secondary phase voltages KN in number (where "K" is any integral number) which are sequentially displaced in phase by 180/KN electrical degrees and connected to a common neutral point. In the usual three phase circuit N=3 and K=1. The secondary windings are connected to the several parallel arms of a bridge type semiconductor network having positive and negative buses connected together through a spanning reactor. A single phase electric load is connected between the reactor midpoint and the transformer secondary neutral point. Preferably separate positive and negative commutating circuits are connected directly or effectively across each of the highest firing order valves associated, respectively, with the positive and negative buses (i.e., the last valves to fire during positive and negative half cycles of single phase output voltage). If desired a pair of star-connected polyphase secondary windings or a secondary winding of the ring type may be connected to supply two such bridge networks, with the single phase load circuit connected between the reactor midpoints of the two networks.

Our invention will be more fully understood and its various objects and advantages further appreciated by referring now to the following detailed specification taken in conjunction with the accompanying drawing in which:

FIG. 1 is a schematic circuit diagram of a two phase semiconductor bridge converter embodying our invention in a form adapted to develop discontinuous single phase current;

FIG. 2 is a graphical representation of current and voltage relationships characteristic of the mode of operation of the circuit of FIG. 1;

FIG. 3 is a schematic circuit diagram of a three phase bridge type semiconductor converter embodying our invention in one form and adapted by commutation to develop single phase current without discontinuity;

Figure 3A:
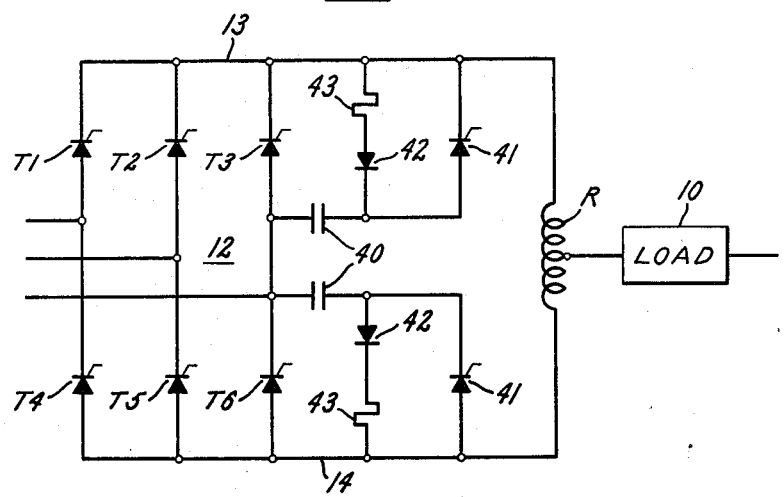
FIG. 3A is a fragmentary schematic circuit diagram illustrating another form of commutating circuit appropriate for use in the bridge circuit of FIG. 3.

Referring now particularly to FIG. 1, we have illustrated a phase converter interposed between a single phase alternating current load circuit 10 and a two phase, three wire, power supply circuit 11. The converter comprises two phase power transformer having primary windings P1, P2 and secondary windings S1, S2, and a bridge type thyristor network 12. The thyristor bridge 12 comprises two unilaterally conductive circuit branches in parallel circuit relation between positive and negative bus conductors 13 and 14 respectively. Each parallel branch of the bridge comprises a pair of thyristors similarly oriented and connected in series circuit relation between the positive and negative network bus conductors 13, 14. These thyristors are designated as T1, T2, T3, and T4, the thyristors T1, T3 being in series in one bridge arm and the thyristors T2, T4 being in series in the other bridge arm. The transformer secondary windings S1, S2 are connected in star circuit relation to a neutral point $n$ with the phase terminal of each winding connected to one thyristor bridge arm intermediate the two thyristors in that arm. The positive and negative bus conductors 13 and 14 are conductively connected together through a spanning conductor S and the single phase load circuit 10 is connected between the conductor S and the transformer secondary neutral point $n$.

As is well known to those skilled in the art, the thyristors T1, T2, T3 and T4 are semiconductor type unidirectional conducting devices each provided with anode and cathode electrodes and a trigger, or gating, electrode. By applying a suitably timed voltage pulse to the gate electrode during any half cycle of positive anode-to-cathode voltage the phase angle or "gating angle" at which conduction of the thyristor is initiated may be controlled. Conduction of each thyristor is terminated at the next current zero, whether it occurs naturally as a consequence of the applied alternating voltage or forcibly by the imposition of a commutating voltage. By "gating angle" therefore, we mean the phase angle, as measured from the start of forward voltage impressed on the thyristor, at which each thyristor is triggered into conduction. The interval during which the thyristor subsequently conducts following each triggering is generally referred to as the "conduction angle".

For the purpose of triggering the thyristors T1-T4 of FIG. 1 in the order T1-T2-T3-T4, and at appropriate times in each conductive half cycle, we provide a suitable gate signal generator 15 and gating angle control means 16 shown in block form. Appropriate forms of such gating and control circuitry will be evident to those skilled in the art as the description of operation proceeds.

To illustrate the mode of operation of the phase converter illustrated at FIG. 1 we have shown at FIG. 2 a graphical representation of the output voltage waves $V_1$ and $V_2$ of the transformer secondary phase winding S1, S2, respectively, with respect to zero voltage at the neutral point $n$. The relative polarity of the associated pairs of primary and secondary windings P1, S1 and P2, S2 are indicated by the conventional dot at one end of each winding. In this convention the voltage across a winding is considered positive when the terminal with the dot is more positive than the other terminal. As is evident from FIGS. 1 and 2 the secondary winding output voltages $V_1$ and $V_2$ are relatively displaced by 90 electrical degrees. Considering load current to flow in a positive direction when the secondary windings S1, S2, have the polarity indicated, it follows that positive half cycles of load current ($+I_L$) flow through the positive bus 13 and negative half cycles of load current ($-I_L$) flow through the negative bus 14. On the drawing the directional arrows associated with each secondary windings represent current pulses delivered to the load from the positive bus 13.

FIG. 2 represents voltage and current conditions in the transformer secondary phase windings when the load 10 is purely resistive and the single phase current is in phase with the applied voltage. As shown at FIG. 2 the thyristor T1 is gated to initiate flow of current at time $t_1$ during the positive half cycle of voltage $V_1$. The resulting load current pulse is in phase with the voltage $V_1$ and flows during the remainder of that half cycle, as is indicated by the shaded area $i_1$ above the zero axis. Similarly the thyristor T2 is gated at a time $t_2$ during the positive half cycle of the voltage $V_2$ and generates a positive load current pulse $i_2$. During the negative half cycles of the secondary voltages $V_1$ and $V_2$ the thyristors T3 and T4 are triggered in like manner at times $t_3$, $t_4$, respectively, to generate the negative load current pulses $i_1$, $i_2$ shown at FIG. 2. It will now be evident that the positive current pulses $i_1$, $i_2$ and the negative current pulses $i_1$, $i_2$, are repeated sequentially during each cycle of the voltage waves $V_1$ and $V_2$, and that their integral constitues a single phase alternating current of the same frequency as the power frequency.

For the sake of simplicity of illustration we have shown the spanning conductor S at FIG. 1 as a simple conductor without discrete impedance and hae illustrated no commutating means for terminating conduction of the thyristors T1 – T4 prior to a natural current zero. For this reason we have illustrated at FIG. 2 gating angles sufficiently delayed with respect to the impressed voltage that the positive current pulses $i_1$, $i_2$ do not overlap. Similarly the negative current pulses $i_1 i_2$ do not overlap. The converter therefore operates in what may be referred to as a discontinuous mode, so that no forced commutation is required to transfer from positive current pulse $i_2$ to the succeeding negative current pulse $i_1$.

It will now be evident to those skilled in the art that by advancing the gating angles of the several thyristors, preferably in unison, the average value of single phase current may be increased. If desired therefore, the load current may be gradually increased from zero to a desired value and the load 10 thus brought on line gradually. In the circuit of FIG. 1 however the gating angle for any phase cannot be advanced beyond the point of termination of the next preceding current pulse. Beyond such point current flow in each half cycle becomes "continuous" so that current limiting and commutating means must be provided between the positive and negative bus conductors 13, 14.

Considering further the discontinuous mode of converter operation as illustrated at FIG. 2, it will be evident that balanced and equal currents $i_1$, $i_2$ exist in the power transformer secondary windings S1, S2 and correspondingly in the transformer primary winding P1 and P2. Thus while single phase current at power system frequency is supplied to the load 10, the polyphase supply circuit 11 remains in a balanced condition of current and voltage as between the phases. It will now be understood by those skilled in the art that, if desired, the primary windings P1 and P2 of FIG. 1 may be arranged in the well known "Scott T" connection for supply from a three phase source of power supply and that with secondary windings arranged as at FIG. 1 the single phase load 10 will not cause voltage of current unbalance on the three phase system.

At FIG. 3 we have illustrated a three phase embodiment of our invention including commutating means to provide for "continuous", or contiguous flow of polyphase current pulses during each half cycle of single phase current. At FIG. 3 power transformer primary windings P1, P2 and P3 are connected in delta circuit relation to three phase line conductors 20, 21, 22. Transformer secondary windings S1, S2 and S3 are star connected to a neutral point $n$. As indicated by the polarity marking dots associated with the transformer windings, the secondary winding S2 is reversely connected to the neutral point $n$ with respect to its normal position in a three phase wye-connected secondary. The secondary winding output voltages therefore are displaced by 60 electrical degrees, rather than 120° as in the usual three phase wye connection. These output voltages are supplied to three parallel unilaterally conducting arms of the bridge circuit 12 connected, as at FIG. 1, between positive and negative bus conductors 13 and 14, respectively. At FIG. 3 the thyristors connected to the positive bus 13 are designated T1, T2 and T3 and the thyristors connected to the negative bus 14 are designated T4, T5 and T6 in the order shown. The currents $i_1$, $i_2$, $i_3$ traversing the secondary windings S1, S2, S3 respectively of FIG. 3 flow on positive half cycles to the positive bus 13 through thyristors T1, T2, T3, (as indicated on the drawing) and on negative half cycles from the negative bus 14 through thyristors $T_4$, $T_5$, $T_6$. Compensating currents flowing in the corresponding primary windings P1, P2, P3 are designated $i'_1$, $i'_2$ and $i'_3$, it being understood of course that in magnitude and primary and secondary currents are inversely proportional to the transformer turns ratio. Currents in the three phase line conductors 20, 21, and 22 are designated respectively as $I_A$, $I_B$ and $I_C$ and load current is designated $I_L$.

In the continuous conduction mode it is necessary to forcibly commutate the flow of single phase current between the positive and negative network bus conductors 13, 14 as single phase current reverses direction. For this purpose we provide a commutating circuit connected across each of the highest firing order positive and negative thyristors T3 and T6, as will be more fully described hereinafter.

In order to enable thyristor conduction in the continuous mode in the three phase circuit of FIG. 3 a spanning reactor R is connected in the conductor S and the load circuit 10 is connected between the reactor midpoint 25 and the transformer secondary winding neutral point n.

The purpose of the spanning reactor R is to limit current between the positive and negative network buses during commutation. For applications to a primarily resistive load the reactor may be relatively small. Where the load is inductive and capacitive load compensation, such as with an induction furnace load, the output circuit is an oscillatory circuit and capable of generating sinusoidal voltage at source frequency. In such case a relatively large spanning reactor in order to force the load current to assume a square wave form and more effectively balance current between the network valves. The winding halves of the reactor should be closely coupled so that rapid transfer of current between the network buses may be effected.

Figure 4:
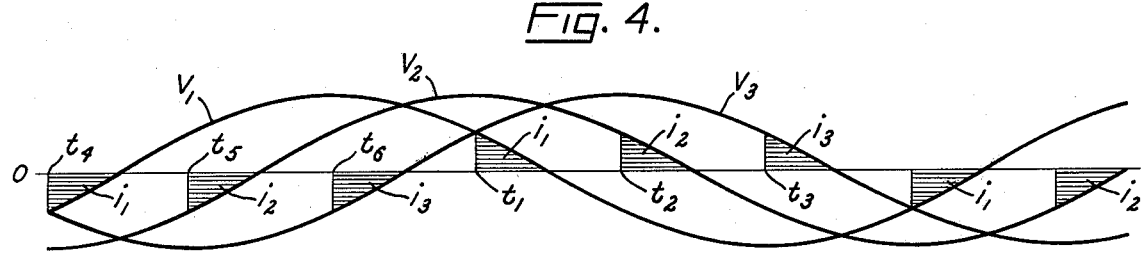
FIGS. 4, 5 and 6 are graphical representations of current and voltage relationships characteristic of several modes of operation of the converter circuit of FIG. 3.

At FIG. 4 we have illustrated, in a manner similar to that shown at FIG. 2, the discontinuous mode of operation of the three phase to single phase converter shown at FIG. 3. As may be observed from FIG. 4, the secondary winding output voltages $V_1$, $V_2$ and $V_3$ are displaced by 60 electrical degrees so that as the thyristors T1 – T6, respectively, are triggered into operation at times $t_1 - t_6$, respectively, they give rise to short discontinuous positive and negative current pulses $i_1$, $i_2$, $i_3$ in the transformer secondary windings S1, S2, S3, respectively. It will be evident to those skilled in the art that the sum of these current pulses constitutes a single phase alternating current at the frequency of the power source. As shown at FIG. 4 the positive half cycle of single phase current is the sum of positive pulses of $i_1$, $i_2$ and $i_3$, while the negative half cycle is the sum of negative pulses of $i_1$, $i_2$ and $i_3$.

The secondary phase currents $i_1$, $i_2$ and $i_3$ illustrated at FIG. 3 are reflected in opposite phase relation in the transformer primary windings as primary phase currents $i'_1$, $i'_2$ and $i'_3$. Due to the delta primary connection shown at FIG. 3, the primary line current $I_A$, $I_B$, $I_C$ are related to the secondary phase winding currents by the following formulae:

$$I_A = i'_1 - i'_3$$

$$I_B = i'_2 + i'_3$$

$$I_C = -i'_1 - i'_2$$

Figure 5:
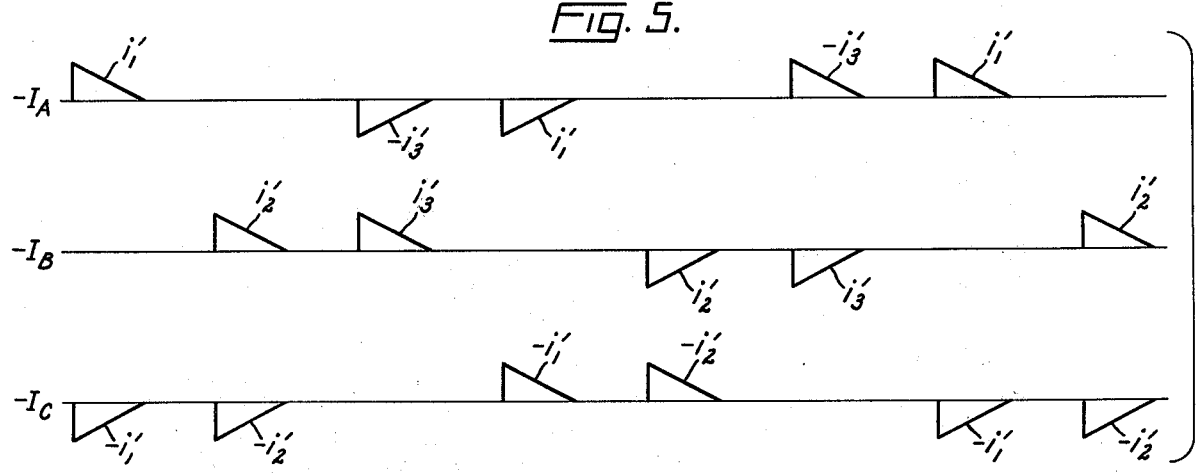

To illustrate that the foregoing primary circuit line currents are balanced I have illustrated such currents at FIG. 5.

Figure 6:
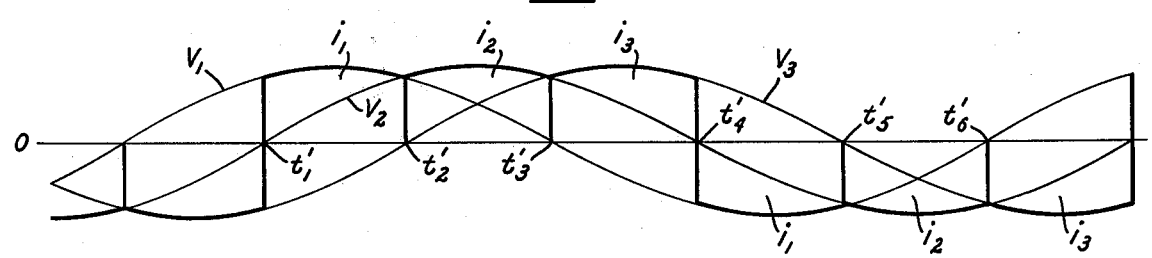

At FIG. 6 we have illustrated in graphical manner similar to that of FIG. 4 the continuous mode of operation of the circuit illustrated at FIG. 3. In this mode the gating angle of each thyristor is fully advanced to the forward-most point of each half cycle of voltage. FIG. 6 shows the three secondary output voltages $V_1$, $V_2$, $V_3$ displaced by 60° as at FIG. 4, but with the gating of the thyristors T1 – T6 advanced, respectively, to the times $t'_1 - t'_6$. Assuming still that the load 10 is purely resistive so that the phase current impulses are in phase with the respective phase voltages the contigous positive current pulses $i_1$, $i_2$, and $2_3$ form a continous positive half cycle of single phase current as polyphase current is commutated naturally by voltage override from thyristor T1 to thyristor T2 and then to thyristor T3. At time $t'_4$, however, when the negative bus thyristor T4 is gated, it is necessary to forceably commute current from thyristor T3 and positive bus 13 to thyristor T4 and negative bus 14. This is accomplished by a commutating capacitor 26 of FIG. 3, as will be explained hereinafter. Subsequently the negative current pulses $i_2$ and $i_3$ result by natural commutation in the same manner as the positive pulses $i_2$ and $i_3$. The resulting singe phase 60 cycle alternating current in the load 10 is reflected as balanced current in the three phase primary lines 20, 21, 22 in a manner similar to that illustrated at FIG. 5 for the discontinuous operating mode.

The commutating circuits of FIG. 3 comprise separate positive and negative bus commutating circuits, each including a commutating capacitor and a thyristor connected in series circuit relation with a commutating inductor directly across one of the highest firing order thyristors T3, T6. A separate charging source of unidirectional voltage in series with a charging resistor is connected in shunt with each commutating capacitor. Specifically, the positive bus commutating circuit comprises a capacitor 26 connected in series circuit relation with a thyristor 27 and inductor 27a between the common terminal of thyristors T3, T6 and the positive bus 13, with a charging source such as a battery 28 connected through a resistor 28a in shunt circuit relation with the capacitor 26. The thyristor 27 is oriented for conduction of current toward the positive bus 13 and the battery 28 is poled to charge the capacitor 26 in a direction to discharge through the thyristor 27. The voltage of the charging battery 28 is greater than the instantaneous voltage $V_3$ existing on bus conductor 13 at the time of commutation, as for example greater than the instantaneous voltage $V_3$ (FIG. 6) at the time $t'_4$. Similarly the negative bus commutating circuit comprises a capacitor 30 connected in series circuit relation with a thyristor 31 and an inductor 31a between the common terminal of thyristors T3, T6 and the negative bus 14, with the thyristor 31 poled to conduct current away from the negative bus 14. A charging battery 32 and series resistor 32a are connected in shunt circuit relation with the capacitor 30 with the battery poled to charge the capacitor 30 in a direction to discharge through thyristor 31.

The operation of the commutating circuit shown at FIG. 3 is as follows:

Referring to the continuous operating mode graphically illustrated at FIG. 6 and beginning at the time $t'_1$ when the thyristor T1 begins to conduct, it will be observed that T1 conducts until time $t'_2$ when the anode voltage on thyristor T2 becomes higher than the cathode, or positive bus, voltage then applied to the cathode of T2. At this time thyristor T2 is gated and takes over the flow of current by natural commutation. Like action occurs in transfer to the thyristor T3 at time $t'_3$ when the thyristor T3 is gated. At the time $t'_4$, however, when the negative bus thyristor T4 is gated current in the thyristor T3 and bus 13 must be terminated by forced commutation. When T4 is gated into conduction T3 is still conductive and the reactor R serves to limit current in the otherwise direct connection between phase windings S3 and S1. Upon gating of T4 the commutating thyristor 27 is also gated to connect the positive terminal of the previously charged commutating capacitor 26 directly to the positive bus 13. The charging circuit for capacitor 26 includes the battery 28 which has been effective to charge the capacitor over the previous full cycle of voltage during which thyristor 27 remained non-conductive. The resistor 28a serves to limit rapid build up of charging current and to damp oscillation of the capacitor 26 during discharge. When the thyristor 27 is gated the discharge circuit for capacitor 26 incudes the thyristor 27 and the then conducting thyristor T3. A short impulse of discharge current through this circuit in a direction opposite to load current in thyristor T3 forces current in the thyristor T3 to zero and terminates conduction in thyristor T3. Thereupon current flow is taken over by thyristor T4 and the negative bus 14. The commutating inductor 27a serves to limit rate of change of discharge current through the thyristor 27. In similar manner the commutating circuit comprising capacitor 30, thyristor 31 and the charging source 32 effects forced commutation at time $t'_1$ from the negative bus 14 and thyristor T6 to the positive bus 13 and thyristor T1.

At FIG. 3A we have shown a fragmentary circuit diagram of a converter similar to that shown at FIG. 3 wherein the same bridge circuit 12 and load circuit 10 is illustrated in conjunction with a center tapped reactor R, but in which the commutating circuit is in different form. Referring to FIG. 3A, each of the bridge thyristors T3 and T6 has connected in shunt circuit therewith a capacitor 40 and a commutating thyristor 41 in series circuit relation. The commutating thyristor 41 is shunted by a diode 42 in series circuit relation with a current limiting resistor 43.

The operation of the commutating circuit illustrated at FIG. 3A may be understood by referring for example to the commutating circuit associated with the thyristor T3 taken in conjunction with the current and voltage characteristics illustrated at FIG. 6. During the conducting interval of thyristors T1 and T2 the capacitor 40 is charged to nearly the instantaneous maximum voltage of the voltage curve $V_3$ (FIG. 6). With fully advanced firing line to line voltage is available for charging. At the instant $t_4$, the commutating thyristor 41 is gated to provide a discharge circuit for capacitor 40 and thereby to overcome the forward voltage drop of thyristor T3. Thyristor T3 therefore passes through a forced current zero and terminates conduction. At substantially the same instant thyristor T4 is gated to initiate conduction therein.

It will now be apparent to those skilled in the art that commutating circuits similar to those of FIGS. 3 and 3A may, if desired, be connected between the positive and negative bus conductors 13, 14 and either the transformer secondary neutral point N or the midpoint of reactor R. In such connection to the neutral N the transformer secondary winding S3 is in series in the discharge circuit and in connection to the reactor R the transformer secondary and the load are in the discharge circuit. In either case the commutating capacitor is effectively connected across the associate thyristor T3 or T6 so long as the transient impedances of the transformer winding and load are relatively low.

Figure 7:
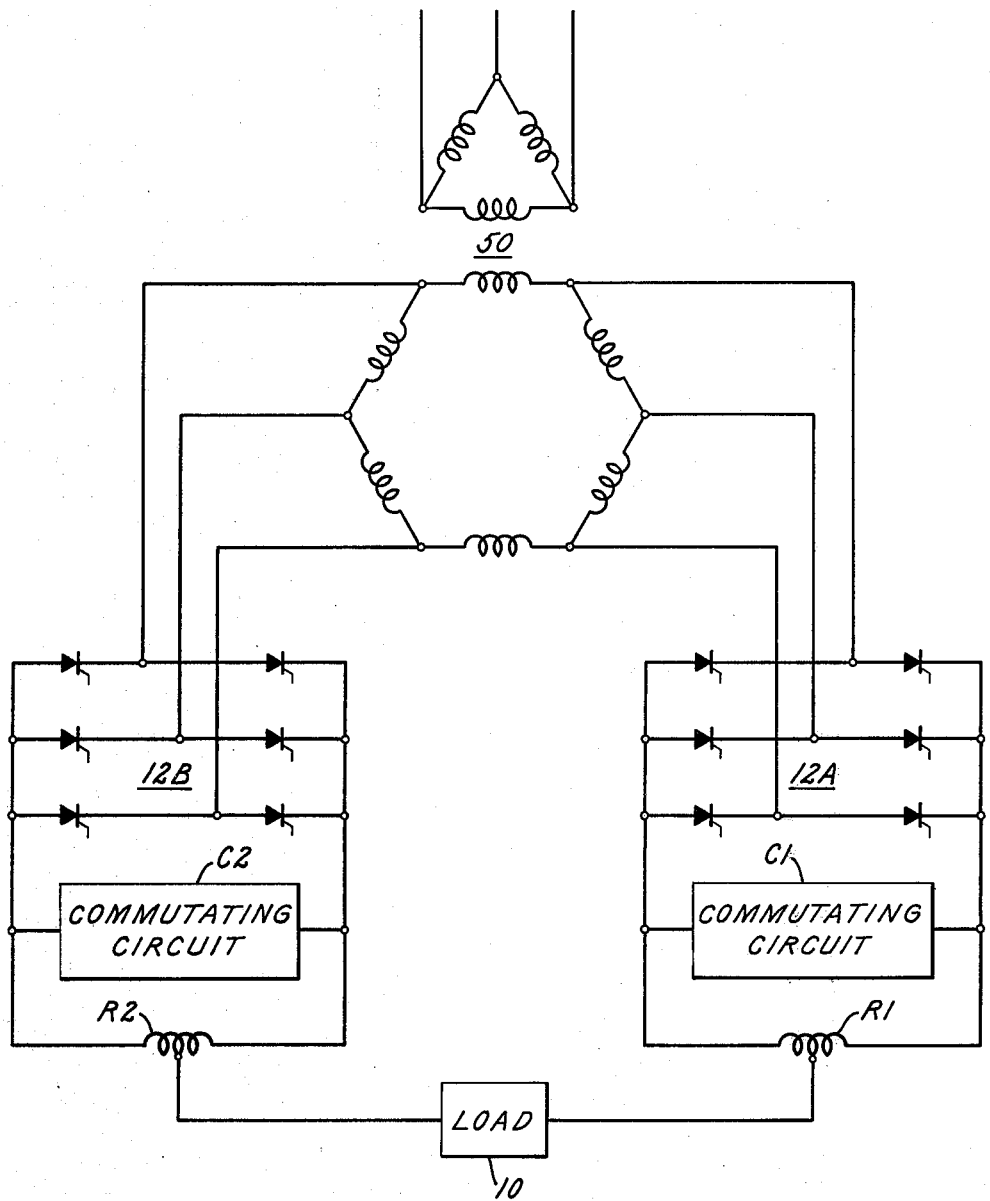
FIG. 7 is a schematic circuit diagram of a three phase semiconductor bridge converter utilizing a six phase ring type transformer secondary winding and a pair of three phase semiconductor converters supplying a single phase load.

It will now be understood by those skilled in the art that our invention may be utilized for connecting a single phase load to a polyphase circuit of any desired number of phases without change in frequency and so long as the power transformer secondary winding is connected to provide secondary terminal output voltages N in number displaced in phase by 180/N electrical degrees. For secondary phase voltages greater in number than three this may be accomplished by ring connected secondary windings or a plurality of Y connected secondary windings in combination with one or more pairs of semiconductor bridge networks. Such an arrangement for a six phase ring-connected secondary winding of a power transformer 50 is illustrated at FIG. 7. In this case three terminals of the six phase ring-connected secondary winding are connected to a three phase bridge network 12A and the other three terminals are connected to a three phase bridge network 12B. The load 10 is connected between the mid-points of the two spanning reactors R1 and R2, respectively. It will be understood that for operation in the continuous mode suitable commutating circuits C1 and C2 are included in the respective bridge networks.

While we have illustrated only certain preferred embodiments of our invention by way of illustration, many modifications will occur to those skilled in the art, and we therefore wish to have it understood that we intend in the appended claims to cover all such modifications as fall within the true spirit and scope of our invention.

What we claim as new and desire to secure by Letters Patent of the United States is:

1. Electric phase conversion apparatus for connecting a single phase electric load to a polyphase alternating current power supply circuit of N phases without change in frequency or unbalance of polyphase current or voltage which comprises, means for deriving from said supply circuit KN phase voltage sources in polyphase relation with phase voltages sequentially displaced in phase by 180/KN electrical degrees where K is an integral number, a pair of single phase load circuit terminals, a semiconductor bridge network including positive and negative network bus conductors and KN pairs of gate controlled semiconductor devices, the semiconductor devices of each said pair of devices connecting one terminal of each said phase voltage source selectably to said positive or negative network bus conductors, a spanning connection conductively connecting together said positive and negative bus conductors, means connecting said load circuit terminals between said spanning connection and the other terminal of each said phase voltage sources, and phase controlled gating means for sequentially triggering each said semiconductor device at power circuit frequency to conduct for equal intervals during each half cycle of phase voltage sequentially applied to said devices in conductive polarity.

2. In an electric phase conversion apparatus according to claim 1 wherein K is an even number, means connecting said phase voltage sources in a ring circuit relation, a pair of said semiconductor bridge networks, and means connecting one said load circuit terminal to the spanning connection of each said network respectively.

3. An electric phase conversion apparatus according to claim 1 wherein said phase voltage sources are star connected to a neutral point and one said load terminal is connected to said neutral point.

4. An electric phase conversion apparatus according to claim 1 wherein N is three, K is unity and said phase voltage sources are star connected to a neutral point.

5. In an electric phase conversion apparatus according to claim 1, a reactor in said spanning connection between said positive and negative network bus conductors, the midpoint of said reactor being connected to one said load terminal, commutating means effectively connected across each semiconductor device which is last to conduct during positive and negative half cycles respectively of single phase output current, and means for actuating each said commutating means at power system frequency to transfer load circuit current from one said network bus conductor to the other.

6. Electric phase conversion apparatus according to claim 5 wherein each said commutating means comprises, a capacitor, means for charging said capacitor, and semiconductor switching means for alternately connecting said capacitors effectively across the semiconductor devices last to conduct in any half cycle of output current and in a polarity to forcibly terminate conduction through said devices.

* * * * *